United States Patent [19]
Slater

[11] Patent Number: 6,025,656
[45] Date of Patent: Feb. 15, 2000

[54] ELECTRICAL CIRCUIT FOR AUTOMOBILE LIGHTS

[76] Inventor: Benjamin Daniel Slater, 2211 E. Mohawk Rd., No. St. Paul, Minn. 55109

[21] Appl. No.: 08/966,664

[22] Filed: Nov. 10, 1997

[51] Int. Cl.[7] .................................................. B60Q 1/46
[52] U.S. Cl. ..................... 307/10.8; 340/475; 340/478; 340/479; 361/191; 315/82; 701/36
[58] Field of Search ................... 307/9.1, 10.1, 307/10.7, 10.8; 361/191–193; 340/463, 465, 468, 475, 476, 477, 478, 479, 480; 315/76, 77, 82, 83; 701/36, 45, 49

[56] References Cited

U.S. PATENT DOCUMENTS

| | | |
|---|---|---|
| 3,896,415 | 7/1975 | Carter, III .............................. 340/67 |
| 3,970,860 | 7/1976 | Purdy .................................... 307/10.8 |
| 4,403,210 | 9/1983 | Sullivan ................................. 340/72 |
| 4,670,736 | 6/1987 | Ulrich ................................... 307/10.8 |
| 4,812,808 | 3/1989 | Ulrich ................................... 307/10.8 |
| 5,455,558 | 10/1995 | Gregory ............................... 340/474 |
| 5,734,203 | 3/1998 | Slater ................................... 307/10.8 |

*Primary Examiner*—Albert W. Paladini
*Attorney, Agent, or Firm*—Thomas B. Tate

[57] ABSTRACT

An automobile electrical circuit including a battery, turn signal switch, flashers, parking light switch, brake switch, relays, and front and rear lights. In the daytime or at night, the high filaments flash when the turn signal on that side is activated. At night, the low filaments flash synchronously with the high filaments when the turn signal on that side is activated.

1 Claim, 1 Drawing Sheet

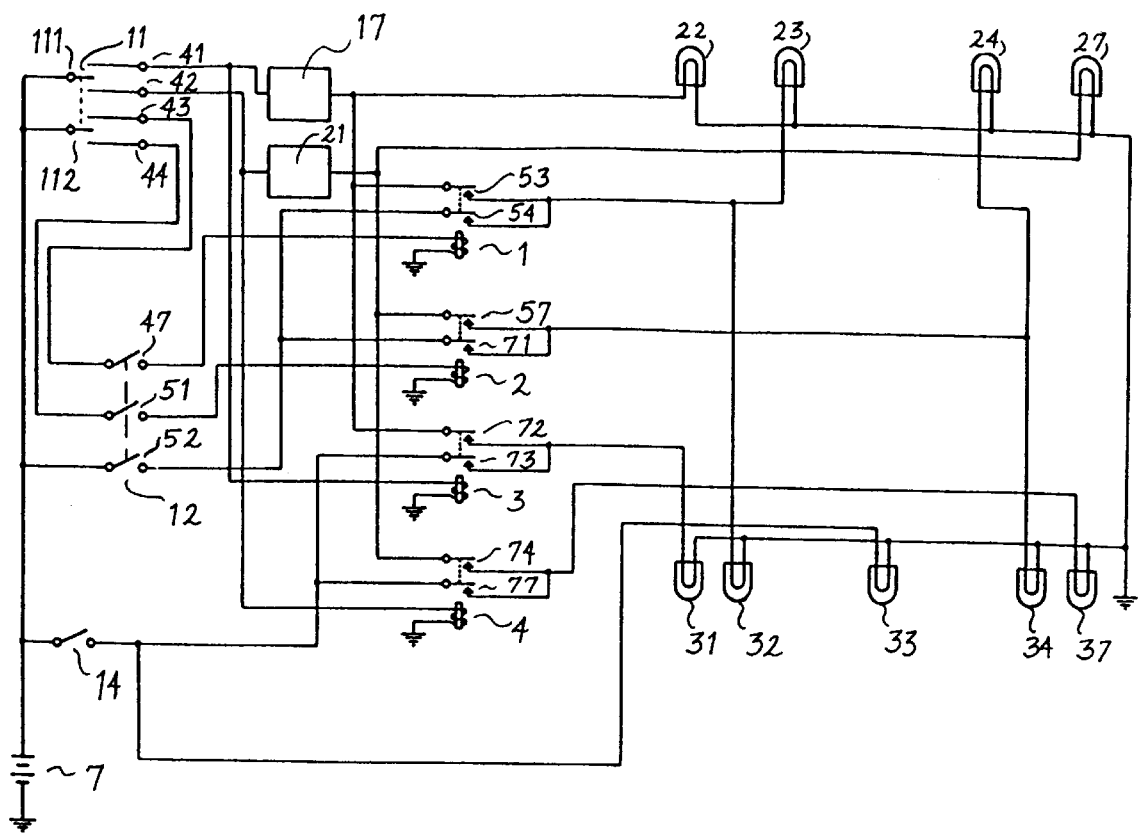

ELECTRICAL CIRCUIT FOR AUTOMOBILE LIGHTS

BACKGROUND OF THE INVENTION

The field of invention is electrical circuits for automobile lights, specifically circuits which allow high and low filaments to flash synchronously.

The closest known prior art is a system used on some General Motors cars in which the turn signal lights (high filaments) serve as daytime running lights by staying on high when the turn is complete.

SUMMARY OF THE INVENTION

In the circuit which is the instant invention, the tail lights and parking lights are low filaments, and the turn signal lights and the brake lights are high filaments. When the turn signal is activated at night, the high and low filaments on the same side as the turn signal (for example, left side for left turn signal or right side for right turn signal) flash together. During the daytime, the turn signal flashes normally if the headlights and tail lights are off. This assumes that under normal daytime driving conditions, the driver will leave the parking light switch turned off, and under normal night-time driving condition, the driver will turn the parking light switch on. Thus, in this specification, the terms "by day" or "during the daytime" refer to the situation where the parking light switch is off, and the terms "by night" or "at night" refer to the situation where the parking light switch is on, regardless of the actual time of day the vehicle is being driven.

The advantage of the present invention compared to the prior art is that it allows drivers approaching or following the vehicle to see the lights better.

BRIEF DESCRIPTION OF THE FIGURE

The FIGURE is a schematic diagram.

DETAILED DESCRIPTION OF THE INVENTION

The invention is an electrical circuit for automobile lights. The components of this circuit include a battery 7, a double-pole double-throw turn signal switch 11 having a center off position, a triple-pole single-throw parking light switch 12, a brake switch 14, flashers 17 and 21, double-pole single-throw relays 1, 2, 3, and 4, front lights including left high filament (turn signal light) 22, left low filament (parking light) 23, right low filament (parking light) 24, and right high filament (turn signal light) 27, and rear lights including left high filament (turn signal light) 31, left low filament (tail light) 32, middle brake high filament (middle brake light) 33, right low filament (tail light) 34, and right high filament (turn signal light) 37.

Turn signal switch 11 has a first pole 111 with left 41 and right 42 positions and a second pole 112 with left 43 and right 44 positions. Parking light switch 12 has a first normally open contact 47, a second normally open contact 51, and third normally open contact 52. Relay 1 has a normally open contact 53 and a normally closed contact 54. Relay 2 has a normally open contact 57 and a normally closed contact 71. Relay 3 has a normally open contact 72 and a normally closed contact 73. Relay 4 has a normally open contact 74 and a normally closed contact 77.

Wiring connections between various components of this circuit are as shown in the drawing FIGURE, and include the following connections:

Battery 7 to poles 111 and 112 of turn signal switch 11;
Battery 7 to contact 52 of parking light switch 12;
Battery 7 to brake switch 14;
Turn signal switch 11 (pole 111, left position 41) to flasher 17;
Turn signal switch 11 (pole 111, left position 41) to relay 3;
Turn signal switch 11 (pole 111, right position 42) to flasher 21;
Turn signal switch 11 (pole 111, right position 42) to relay 4;
Turn signal switch 11 (pole 112, left position 43) to contact 47 of parking light switch 12;
Turn signal switch 11 (pole 112, right position 44) to contact 51 of parking light switch 12;
Flasher 17 to front left high filament 22;
Flasher 17 through contact 53 of relay to front left low filament 23;
Flasher 17 through contact 72 of relay 3 to rear left high filament 31;
Flasher 17 through contact 53 of relay 1 to rear left low filament 32;
Flasher 21 to front right high filament 27;
Flasher 21 through contact 57 of relay 2 to front right low filament 24;
Flasher 21 through relay 4 (contact 74) to rear right high filament 37;
Flasher 21 through contact 57 of relay 2 to rear right low filament 34;
Parking light switch 12 (contact 52) through relay 1 (contact 54) to front left low filament 23;
Parking light switch 12 (contact 52) through relay 2 (contact 71) to front right low filament 24;
Parking light switch 12 (contact 52) through relay 1 (contact 54) to rear left low filament 32;
Parking light switch 12 (contact 52) through relay 2 (contact 71) to rear right low filament 34;
Parking light switch 12 (contact 47) to relay 1;
Parking light switch 12 (contact 51) to relay 2;
Brake switch 14 through contact 73 of relay 3 to rear left high filament 31;
Brake switch 14 through contact 77 of relay 4 to rear right high filament 37;
Brake switch 14 to middle brake light 33.

The following describes the operation of the various filaments in this circuit.

Front Left High Filament 22

By day or night, if turn signal switch 11 is activated to the left position 41, current from the battery 7 flows through turn signal switch 11 and flasher 17 to front left high filament 22, causing filament 22 to flash.

Front Right High Filament 27

By day or night, if turn signal switch 11 is activated to the right position 42, current from the battery 7 flows through turn signal switch 11 and flasher 21 to front right high filament 27, causing filament 27 to flash.

Front Left Low Filament 23

By day (parking light switch 12 is off) filament 23 remains unlit. By night (parking light switch 12 is on), filament 23 remains lit unless the left turn signal is activated. When parking light switch 12 is on, its normally open contact 52 is closed, allowing current from battery 7 to flow through contact 52 and through closed contact 54 of relay 1 to filament 23. If turn signal switch 11 is activated to left positions 41 and 43, normally open contact 47 of parking light 12 closes and normally open contact 53 of relay 1 closes, allowing current from battery 7 to flow through turn signal switch 11, flasher 17, and contact 53 of relay 1 to low filament 23 as well as through flasher 17 to high filament 22. Thus the left high filament 22 and left low filament 23 flash synchronously.

Front Right Low Filament 24

By day, filament 24 remains unlit. By night, filament 24 remains lit unless the right turn signal is activated. When the parking light switch 12 is on, it normally open contact 52 is closed, allowing current from battery 7 to flow through contact 52 and through closed contact 71 of relay 2 to filament 24. If turn signal switch 11 is activated to right positions 42 and 44, normally open contact 51 of parking light switch 12 closes, allowing current from battery 7 to flow through turn signal switch 11, flasher 21, and contact 57 of relay 2 to low filament 24 as well as through flasher 21 to high filament 27. Thus the right high filament 27 and right low filament 24 flash synchronously.

Rear Left High Filament 31

By day or night, if turn signal switch 11 is activated to the left position 41, normally open contact 72 of relay 3 closes, allowing current from battery 7 to flow through switch 11, flasher 17, and contact 72 to high filament 31, causing filament 31 to flash. If the left turn signal is not active and brake switch 14 is activated, current from the battery 7 flows through brake switch 14 and closed contact 73 of relay 3 to high filament 31, causing filament 31 to light and remain lit until brake switch 14 is deactivated.

Rear Right High Filament 37

By day or night, it turn signal switch 11 is activated to the right position 42, normally open contact 74 of relay 4 closes, allowing current from battery 7 to flow through switch 11, flasher 21, and contact 74 to high filament 37, causing filament 37 to flash If the right turn signal is not active, and brake switch 14 is activated, current from battery 7 flows through brake switch 14 an closed contact 77 of relay 4 to high filament 37, causing filament 37 to light and remain lit until brake switch 14 is deactivated.

Rear Left Low Filament 32

By day filament 32 remains unlit. By night filament 32 is lit unless the left turn signal is activated. When parking light switch 12 is on, its normally open contact 52 closes, allowing current from battery 7 to flow through contact 52 and closed contact 54 of relay 1 to filament 32. If turn signal switch 11 is activated to left positions 41 and 43, normally open contact 47 of parking light switch 12 closes and normally open contact 53 of relay 1 closes, allowing current from battery 7 to flow through switch 11, flasher 17, and contact 53 to low filament 32 as well as through flasher 17 and contact 72 to high filament 31. Thus high filament 31 and low filament 32 flash synchronously.

Rear Right Low Filament 34

By day filament 34 remains unlit. By night filament 34 is lit unless the right turn signal is activated. When parking light switch 12 is on, its normally open contact 52 is closed, allowing current from battery 7 to flow through contact 52 and closed contact 71 of relay 2 to filament 34. If turn signal switch 11 is activated to the right positions 42 and 44, normally open contact 51 of perking light switch 12 closes and normally open contact 57 of relay 2 closes, allowing current from battery 7 to flow through switch 11, flasher 21, and contact 57 to low filament 34 as well as through flasher 21 and contact 74 to high filament 37. Thus high filament 37 and low filament 34 flash synchronously.

Middle Brake Filament 33

By day or night, if brake switch 14 is activated, current from battery 7 flows through brake switch 14 to middle brake filament 33, causing filament 33 to light and remain lit until brake switch 14 is deactivated.

I claim:

1. An electrical circuit for automobile lights, said circuit comprising:

a battery;

a double-pole double-throw turn signal switch having a center off position, said switch having a first pole with a left and a right position and a second pole with a left and a right position, said first pole and said second pole each being wired to said battery;

a first flasher wired to said left position of said first pole of said turn signal switch;

a second flasher wired to said right position of said first pole of said turn signal switch;

a triple-pole single-throw parking light switch having a first normally open contact wired to said left position of said second pole of said turn signal switch, a second normally open contact wired to said right position of said second pole of said turn signal switch, and a third normally open contact wired to said battery;

a single-pole single-throw brake switch wired to said battery;

a first double-pole single-throw relay having a normally open contact wired to said first flasher and a normally closed contact wired to said third normally open contact of said parking light switch;

a second double-pole single throw relay having a normally open contact wired to said second flasher and a normally closed contact wired to said third normally open contact of said parking light switch;

a third double-pole single-throw relay having a normally open contact wired to said first flasher and a normally closed contact wired to said brake switch;

a fourth double-pole single-throw relay having a normally open contact wired to said second flasher and a normally closed contact wired to said brake switch;

front flights including a left night filament wired to said first flasher, a left low filament wired to said normally open contact and said normally closed contact of said first relay, a right low filament wired to said normally open contact and said normally closed contact of said second relay, and a right high filament wired to said second flasher;

rear lights including a left high filament wired to said normally open contact and said normally closed contact of said third relay, a left low filament wired to said normally open contact and said normally closed contact of said first relay, a middle brake light wired to said brake switch, a right low filament wired to said normally open contact and said normally closed contact of said second relay, and a right high filament wired to said normally open contact and said normally closed contact of said fourth relay.

* * * * *